(12) United States Patent
Creamer et al.

(10) Patent No.: US 7,224,784 B2
(45) Date of Patent: *May 29, 2007

(54) SUBSCRIBER SERVICE MANAGEMENT

(75) Inventors: Thomas E. Creamer, Boca Raton, FL (US); Peeyush Jaiswal, Boca Raton, FL (US); Victor S. Moore, Boynton Beach, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/741,797

(22) Filed: Dec. 19, 2003

(65) Prior Publication Data
US 2005/0135582 A1    Jun. 23, 2005

(51) Int. Cl.
*H04M 15/00* (2006.01)
(52) U.S. Cl. .................... 379/127.01; 705/40
(58) Field of Classification Search ............. 379/126, 379/127.01, 142.01, 201.01, 201.02, 201.08, 379/204.01, 207.15, 207.14, 207.13, 265.01, 379/265.02, 265.13, 265.09, 266.1; 705/40
See application file for complete search history.

(56) References Cited
U.S. PATENT DOCUMENTS
5,206,899 A * 4/1993 Gupta et al. ............... 379/120
6,016,336 A * 1/2000 Hanson .................... 379/88.23
6,744,877 B1 * 6/2004 Edwards ................ 379/265.02
6,785,372 B1 * 8/2004 Blumenschein et al. . 379/114.2
2002/0169719 A1 * 11/2002 Dively et al. .................. 705/40
2004/0064411 A1 * 4/2004 Tsui et al. ..................... 705/40

OTHER PUBLICATIONS
Lozinski, Zygmunt, *Parlay/OSA—A New Way to Create Wireless Services*, IBM, submitted to "IEC Mobile Wireless Data" May 15, 2003, revised Jun. 1, 2003.

* cited by examiner

*Primary Examiner*—Binh K. Tieu
(74) *Attorney, Agent, or Firm*—Richard A. Tomlin, Esq.; Steven M. Greenberg, Esq.; Carey Rodriguez Greenberg & Paul LLP

(57) ABSTRACT

A method, system and apparatus for service management. A service management system can include a name resolution adapter disposed in a PSTN. The name resolution adapter can be communicatively linked to a LIDB also disposed within the PSTN. Notably, an enterprise application can be configured to manage service subscriptions and can enjoy communicative couplings both to the name resolution adapter over a data communications network and also to a switch disposed in the PSTN. Finally, service renewal logic can be associated with the enterprise application and programmed to renew service subscriptions for calling ones of subscribers to the service subscriptions based upon identifying data for the calling ones of the subscribers as received in the enterprise application over the data communications network from the name resolution adapter.

13 Claims, 3 Drawing Sheets

SUBSCRIBER SERVICE MANAGEMENT

BACKGROUND OF THE INVENTION

1. Statement of the Technical Field

The present invention relates to the management of a service subscription for a telephone subscriber, and more particularly to the management of a service subscription based upon call processing provided in a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing customer information or additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs), databases containing service logic and subscriber information which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the business name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center and in the customer service industry. For instance, oftentimes service subscribers seek to renew a service telephonically such as the renewal of a time limited rental of a consumer product such as a movie, an automobile, a household appliance, and the like.

Notwithstanding, a high degree of automation required to implement a renewal or subscription extension service telephonically requires access to substantial identifying information. Typically, at least a name, a portion of a social security number, an address, or an account number will be required to access computing data in an enterprise application programmed to manage the subscription service. In consequence, subscribers can become irritated conversing with a customer service representative, an interactive voice response system, or both simply to provide identifying information sufficient to activate the renewal or extension of a subscription service.

SUMMARY OF THE INVENTION

The present invention addresses the deficiencies of the art in respect to the renewal or extension of a subscription service and provides a novel and non-obvious method, system and apparatus for service management. In accordance with the present invention, a service management method can include the step of establishing a telephone call with a service subscriber over a PSTN. Identifying information for the service subscriber can be received through a computer communications network and the identifying information can be correlated with the established telephone call to identify the service subscriber.

Once the identifying information has been received for the service subscriber and correlated thereto, service information for a service subscribed to by the service subscriber can be retrieved based upon the identifying information. Consequently, the service can be managed by updating the service information with a new service term. In particular, the managing step can include the step of renewing the service term. Additionally, the managing step can include the step of extending the service term.

Notably, the receiving step can include the step of receiving the identifying information over the computer communications network from a name resolution adapter disposed within the PSTN. Specifically, the identifying information can include a name associated with the service subscriber and resolved in the PSTN. Moreover, the name can be resolved in a LIDB disposed in the PSTN.

In accordance with the present invention, a service management system can include a name resolution adapter disposed in a PSTN. The name resolution adapter can be communicatively linked to a LIDB also disposed within the PSTN. Notably, an enterprise application can be configured to manage service subscriptions and can enjoy communicative couplings both to the name resolution adapter over a data communications network and also to a switch disposed in the PSTN. Finally, service renewal logic can be associated with the enterprise application and programmed to renew service subscriptions for calling ones of subscribers to the service subscriptions based upon identifying data for the calling ones of the subscribers as received in the enterprise application over the data communications network from the name resolution adapter.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for managing a subscription service. As used herein, a subscription service can include a consumer or commercial service in which a term can be specified during which term the service can be provided. Examples include the rental of a film, the rental of an automobile, and the rental of a home appliance or a commercial tool, and the provision of consumable materials such as food items, drink items, magazines, newspapers and the like, to name but a few. The subscription service in accordance with the present invention can be renewed for the pre-specified term, or extended for a period of time which differs from the term.

In either circumstance, the subscription service can be operated automatically through identifying information resolved within the PSTN and provided to the service provider electronically concurrently with the placement of a telephone call by the service consumer to the service provider. Significantly, the identifying information can be resolved externally to the service provider within the PSTN. In this way, the service provider can manage the subscription service without first prompting the service consumer for identifying information.

Figure 1:
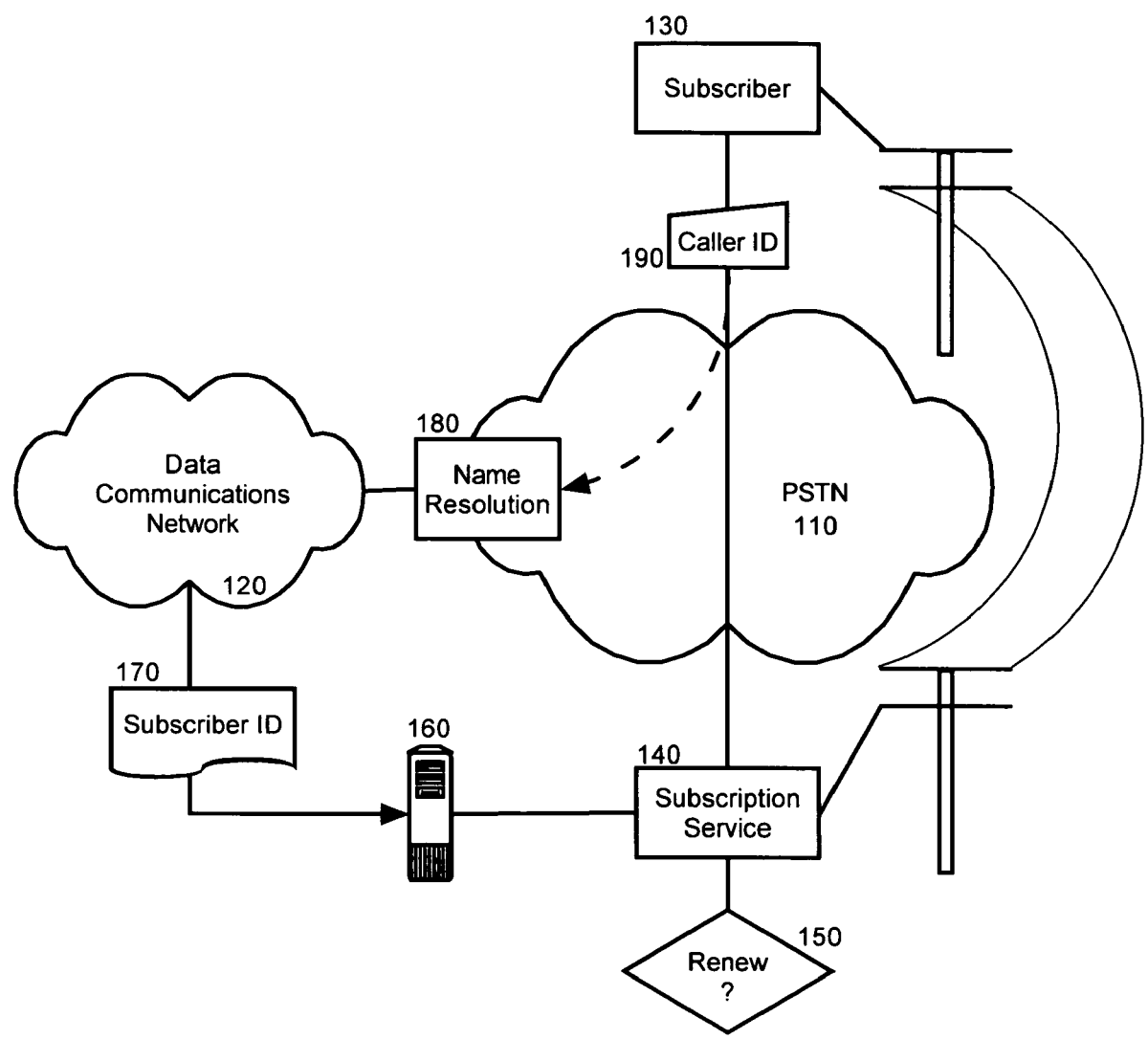
FIG. 1 is a block diagram illustrating a process for managing a subscription service according to the inventive arrangements.

In further illustration, FIG. 1 is a block diagram illustrating a system, method and process for managing a subscription service according to the inventive arrangements. Specifically, a subscriber 130 to a subscription service 140 can extend or renew the subscription service 140 by contacting the subscription service 140 telephonically by way of the PSTN 110. As the subscriber 130 initiates the telephone call in the PSTN 110, a name resolution adapter 180 disposed within the PSTN 110 can capture the caller identification 190 for the subscriber 130 to identify the subscriber 130.

Using the caller identification 190, the name resolution adapter can produce corresponding identification data 170 for the subscriber 130, for instance a name, address, phone number, credit card number, or account number, to name a few. In this regard, the name resolution adapter 180 can query one or more databases disposed within the PSTN 110 to obtain corresponding identifying data 170 for the caller identification 190. Once the name resolution adapter 180 has acquired the identification data 170, the name resolution adapter 180 can provide the identification data 170 to an enterprise application 160 associated with the subscription service 140 over the data communications network 120. Concurrently, the call between the subscriber 130 and the subscription service 140 can be established over the PSTN 110.

Once the enterprise application 160 has received the identification data 170 for the subscriber 130, the enterprise application 160 can use the identification data 170 to obtain the subscription records for the subscriber 130. Importantly, the enterprise application 160 can retrieve the subscription records without first having annoyingly prompted the subscriber 130 over the PSTN 110 for identifying information. In any case, renewal logic 150 can prompt the subscriber 130 to renew or extend the subscription. The subscriber 130 can select a renewal or extension of the subscription service 140 and the enterprise application 160 can update the subscriber records accordingly. Remarkably, the foregoing renewal/extension process can be performed over the PSTN without requiring a single identifying prompt, or the resolution of caller identifying data in the enterprise application.

Figure 2:
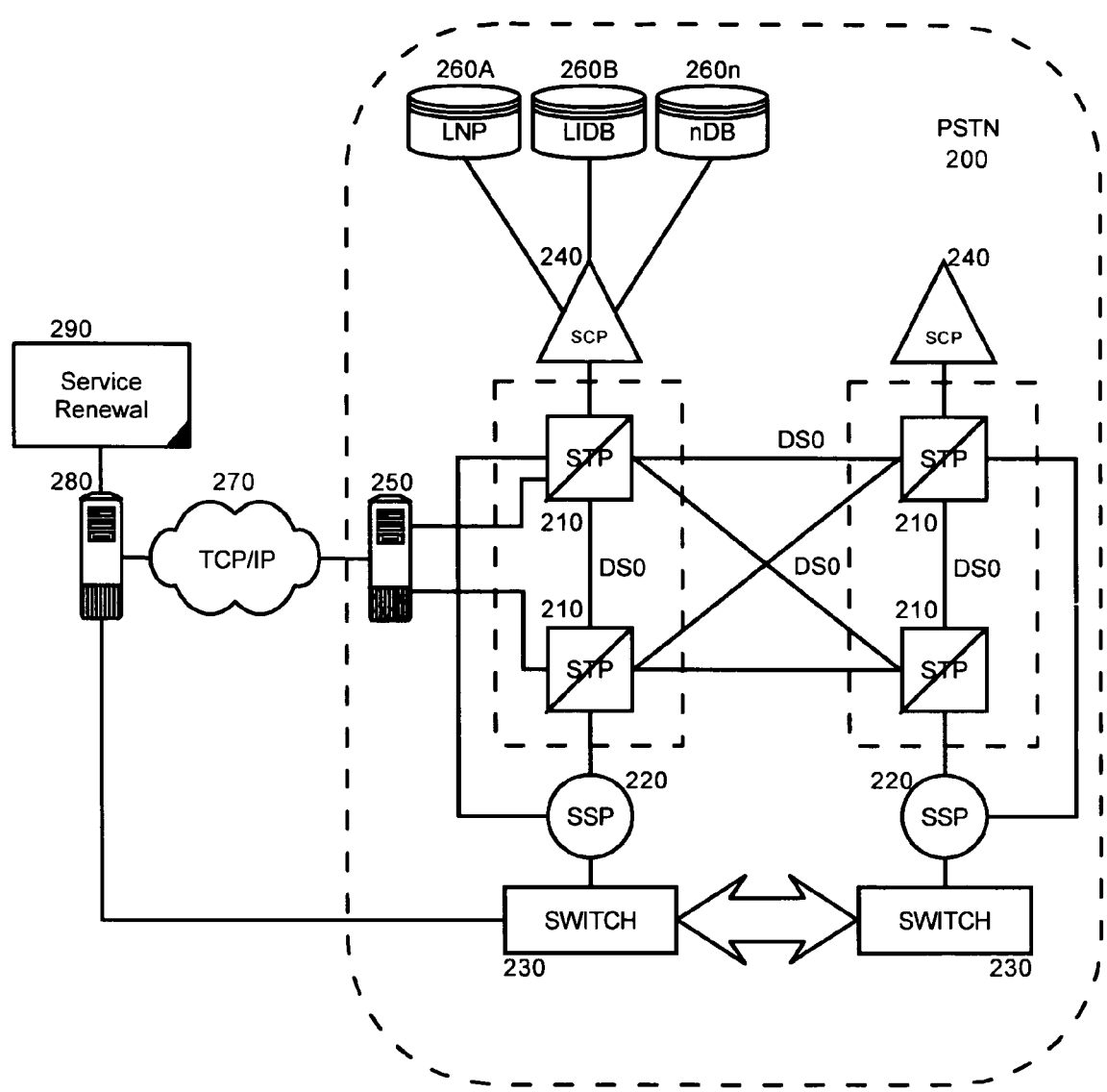
FIG. 2 is a schematic illustration of a system for managing a subscription service using identifying information acquired within a PSTN; and, FIG. 3 is a flow chart illustrating a process for managing a subscription service in the system of FIG. 2.

To further illustrate the preferred embodiments of the present invention, FIG. 2 is a schematic illustration of a system for managing a subscription service using identifying information acquired within a PSTN. As shown in FIG. 2, a system for managing a subscription service using identifying information acquired within a PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers. For example, the databases 260A, 260B, 260n can include a local number portability (LNP) database, a LIDB, or any other such database which can be accessed within an SCP 240.

Notably, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Notably, a name resolution adapter 250 can be coupled to the out-of-band network comprised of inter-connected STPs 210 to access data and logic through the SCP 240 through an exchange of messages such as TCAP messages. The name resolution adapter 250 can include a gateway node 250 having both an interface to the PSTN 200 and also an interface to a data communications network 270 such as an Internet Protocol driven network. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 250 can monitor calls placed to a switch 230 to which the enterprise application 280 has been coupled. As calls are received in the switch 230, the name resolution adapter 250 can receive respective TCAP messages from the STP 210 coupled to the switch 230. Using the TCAP messages, the name resolution adapter 250 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 250 has received the identity of the caller from the LIDB 260B, the name resolution adapter 250 can transmit the identity to the enterprise application 280 over the data communications network 270. The enterprise application 280 subsequently can correlate the caller identity received from the name resolution adapter 250 with a corresponding call received through the switch 230.

Figure 3:
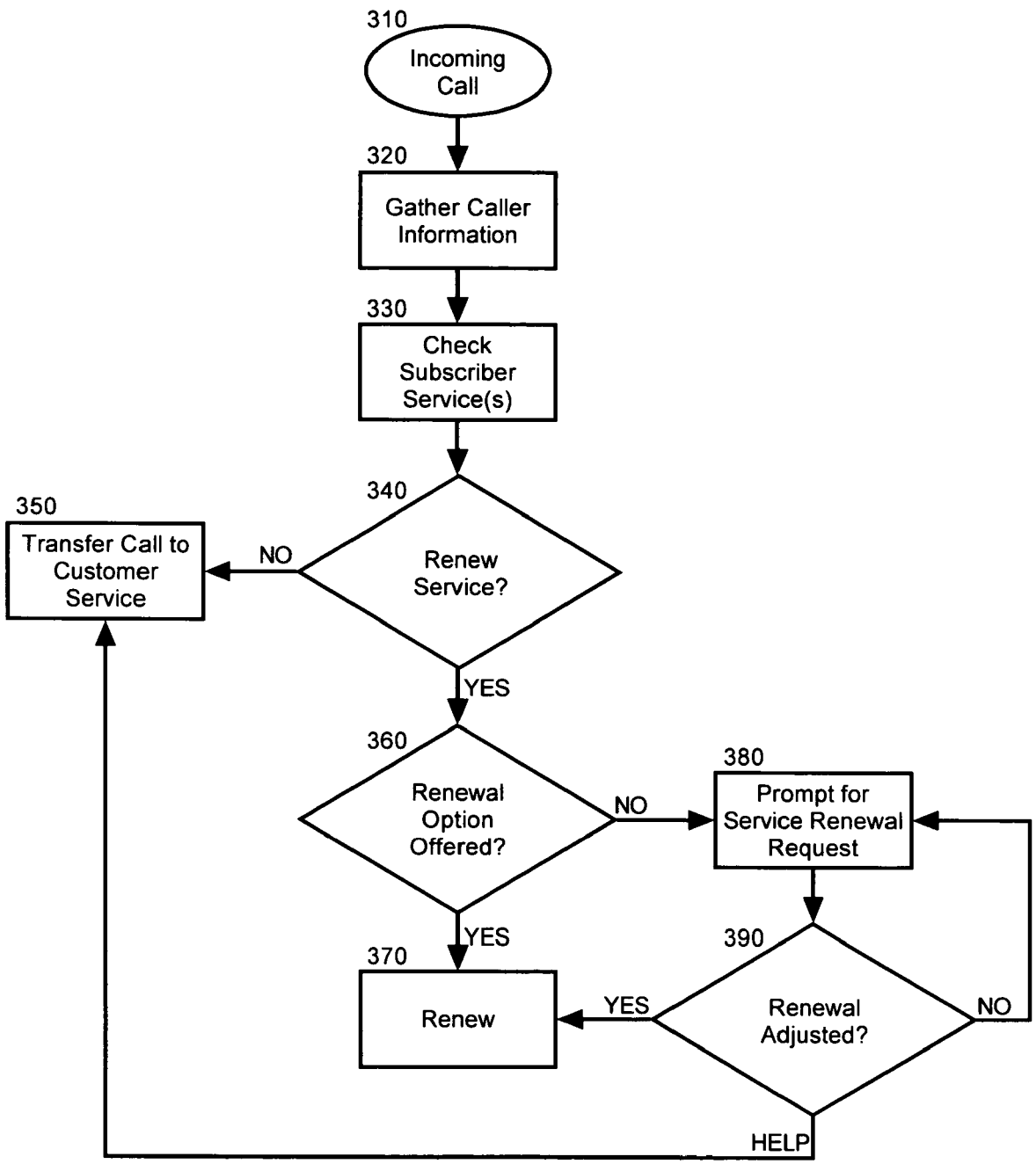

In a preferred aspect of the present invention, service renewal logic 290 can be coupled to the enterprise application 280. The service renewal logic 290 can provide a facility through which service subscribers can renew or extend the term of service without requiring the subscribers to respond to exhaustive prompting necessary to identify the subscribers. In further illustration, FIG. 3 is a flow chart illustrating a process for managing a subscription service in the system of FIG. 2. Beginning in block 310 an incoming telephone call can be received by the service provider through the PSTN. In block 320, identifying information received in the service provider from outside the PSTN through the data communications network can be correlated to the received telephone call in order to identify the caller.

In block 330, the existing services to which the caller has subscribed can be retrieved using the identifying information. Subsequently, in decision block 340 it can be determined whether the caller desires to renew any one of the existing services. If the caller chooses not to renew any one of the existing services, in block 350 the call can be transferred to a customer service representative for further processing. Otherwise, in decision block 360 it can be further determined if a renewal option has been offered for the existing service which the caller has indicated a desire to renew. If the renewal option is offered for the existing service, in block 370 the service can be renewed. Otherwise, in block 380 the caller can be prompted to determine the extent of the renewal required and in decision block 390, once the extent of the renewal has been established, in block 370 the service can be renewed.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A service management method comprising the steps of:
    establishing a telephone call in a subscription service with a service subscriber over a public switched telephone network, (PSTN) the subscription service and the service subscriber being coupled to different portions of the PSTN;
    receiving identifying information for said service subscriber, externally from said established telephone call, through a computer communications network link originating from within a switch in said PSTN and terminating in the subscription service;
    correlating said identifying information with said established telephone call in the subscription service to identify said service subscriber;
    retrieving service information for a service subscribed to by said service subscriber based upon said identifying information; and,
    managing said service by updating said service information with a new service term.

2. The method of claim 1, wherein said receiving step comprises the step of receiving said identifying information over said computer communications network externally from said established telephone call from a name resolution adapter disposed within said PSTN.

3. The method of claim 1, wherein said identifying information comprises one of a name and an address associated with said service subscriber and resolved in said PSTN.

4. The method of claim 1, wherein said identifying information comprises a name associated with said service subscriber and resolved in a line information database disposed in said PSTN.

5. The method of claim 1, wherein said managing step comprises the step of renewing said service term.

6. The method of claim 1, wherein said managing step comprises the step of extending said service term.

7. A service management system comprising:
  a name resolution adapter disposed in a public switched telephone network (PSTN) and communicatively linked to a line information database (LIDB) in said PSTN;
  an enterprise application coupled to an subscription service and configured to manage service subscriptions, said enterprise application having a communicative couplings both to said name resolution adapter over a data communications network link originating in a switch disposed in said PSTN and terminating in the subscription service, and also to PSTN over a telephonic link separate from the data communications network link; and,
  service renewal logic associated with said enterprise application and programmed to renew service subscriptions for calling ones of subscribers to said service subscriptions based upon identifying data for said calling ones of said subscribers as received in said enterprise application over said data communications network link from said name resolution adapter externally from telephone calls for said calling ones of said subscribers on the telephonic link.

8. A machine readable storage having stored thereon a computer program configured for service management, the computer program comprising a routine set of instructions which when executed by a machine cause the machine to perform the steps of:
  establishing a telephone call in a subscription service with a service subscriber over a public switched telephone network (PSTN), the subscription service and the service subscriber being coupled to different portions of the PSTN;
  receiving identifying information for said service subscriber, externally from said established telephone call, through a computer communications network link originating from within a switch in said PSTN and terminating in the subscription service;
  correlating said identifying information with said established telephone call in the subscription service to identify said service subscriber;
  retrieving service information for a service subscribed to by said service subscriber based upon said identifying information; and,
  managing said service by updating said service information with a new service term.

9. The machine readable storage of claim 8, wherein said receiving step comprises the step of receiving said identifying information over said computer communications network externally from said established telephone call from a name resolution adapter disposed within said PSTN.

10. The machine readable storage of claim 8, wherein said identifying information comprises a name associated with said service subscriber and resolved in said PSTN.

11. The machine readable storage of claim 8, wherein said identifying information comprises a name associated with said service subscriber and resolved in a line information database disposed in said PSTN.

12. The machine readable storage of claim 8, wherein said managing step comprises the step of renewing said service term.

13. The machine readable storage of claim 8, wherein said managing step comprises the step of extending said service term.

* * * * *